(12) United States Patent
Rohde

(10) Patent No.: US 11,150,096 B2
(45) Date of Patent: Oct. 19, 2021

(54) METHOD AND DEVICE FOR THE LOCALIZATION OF A VEHICLE BASED ON A DEGREE OF ROBUSTNESS OF THE LOCALIZATION

(71) Applicant: Robert Bosch GmbH, Stuttgart (DE)

(72) Inventor: Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 216 days.

(21) Appl. No.: 16/299,309

(22) Filed: Mar. 12, 2019

(65) Prior Publication Data

US 2019/0285418 A1  Sep. 19, 2019

(30) Foreign Application Priority Data

Mar. 13, 2018 (DE) .......................... 102018203753.1

(51) Int. Cl.
*G01C 21/30* (2006.01)
*B60W 40/02* (2006.01)
*G01C 21/32* (2006.01)
*G01C 21/34* (2006.01)

(52) U.S. Cl.
CPC ............. *G01C 21/30* (2013.01); *B60W 40/02* (2013.01); *G01C 21/32* (2013.01); *G01C 21/34* (2013.01)

(58) Field of Classification Search
CPC .... G01C 21/30; B60W 40/02; B60W 2520/10
See application file for complete search history.

(56) References Cited

U.S. PATENT DOCUMENTS

2019/0265046 A1\*  8/2019  Agarwal ............... G01S 17/931
2019/0272446 A1\*  9/2019  Kangaspunta ....... G05D 1/0212

FOREIGN PATENT DOCUMENTS

DE  102011119762 A1  6/2012
DE  102014223363 A1  5/2016

\* cited by examiner

*Primary Examiner* — Rachid Bendidi
(74) *Attorney, Agent, or Firm* — Norton Rose Fulbright US LLP; Gerard Messina

(57) ABSTRACT

A method for a vehicle localization system includes providing vehicle sensor data including information for an environment and/or an ego movement of the vehicle. A digital map of the environment of the vehicle is provided and a scenario based on the environment of the vehicle is ascertained based on the sensor data and/or based on the digital map. A degree of robustness for the localization system is derived from the ascertained scenario, a current degree of robustness of the localization system is derived, and a current degree of robustness of the localization system is adapted on that basis. Using an allocation module of the localization system, sensor data are allocated to the digital map based on the adapted degree of robustness. Using a position-determination module of the localization system, a position and/or an orientation of the vehicle is/are ascertained based on the sensor data allocated to the digital map.

11 Claims, 2 Drawing Sheets

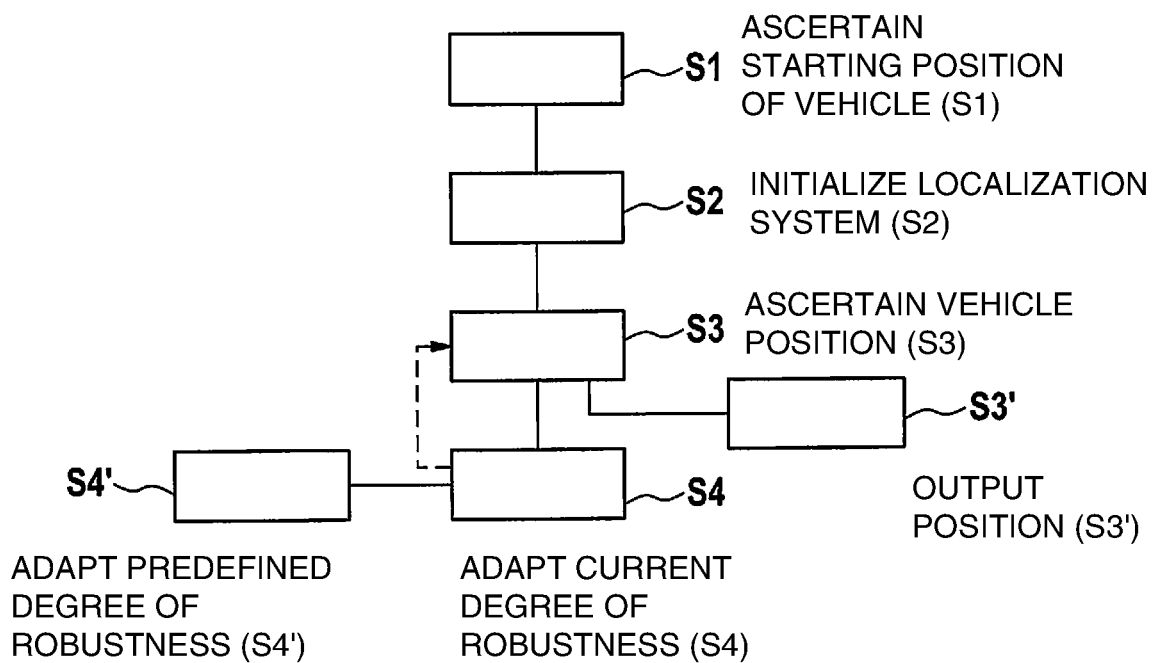

METHOD AND DEVICE FOR THE LOCALIZATION OF A VEHICLE BASED ON A DEGREE OF ROBUSTNESS OF THE LOCALIZATION

CROSS-REFERENCE TO RELATED APPLICATIONS

The present application claims priority under 35 U.S.C. § 119 to DE 10 2018 203 753.1, filed in the Federal Republic of Germany on Mar. 13, 2018, the content of which is hereby incorporated by reference herein in its entirety.

FIELD OF THE INVENTION

The present invention relates to a method for the robust localization of a vehicle, in particular the localization of an at least partially automated vehicle. In addition, the present invention relates to a localization system for the robust localization of a vehicle.

BACKGROUND

The robust localization of vehicles is increasingly further developed for an at least partial automation of the driving of the vehicles. This allows for the utilization of additional information from digital maps in conjunction with sensor data from one or a plurality of sensor(s) of a vehicle in a vehicle-local environment model. The latter can form the basis for planning a driving behavior of the vehicle system, e.g., planning a velocity, a velocity reduction and/or a steering movement. The planning of the driving behavior and/or the associated behavior decision can be used as the basis for planning a trajectory and an adjustment.

Within the scope of a robust localization, sensor data from a number of different sensors are often combined for the detection of an environment of the vehicle. For example, camera data from one or a plurality of camera(s), optionally in combination with a traffic lane detection, radar data from one or a plurality of radar sensor(s), LIDAR data from one or a plurality of LIDAR sensor(s), and/or any other data that contain information about the environment of the vehicle are able to be combined and/or merged.

At least a portion of the sensor data and/or the combined sensor data can be allocated to the digital map, in particular for georeferencing purposes. This is also known as map matching.

Methods for the robust localization can thus be quite complex and computationally intensive. An implementation of corresponding localization systems in the vehicle can therefore be more difficult.

SUMMARY

An improved method for the robust localization of a vehicle and/or an improved localization system is/are able to be provided by example embodiments of the present invention. A computational intensity, in particular, is advantageously able to be reduced in a method according to the present invention.

One aspect of the present invention relates to a method for the robust localization of a vehicle using a localization system. The method includes a step of providing, ascertaining, and/or detecting sensor data of at least one sensor of the vehicle, the sensor data including information pertaining to an environment and/or an ego movement of the vehicle. In addition, the method includes a step of providing a digital map of the environment of the vehicle. The method includes: ascertaining a scenario based on the environment of the vehicle based on the sensor data and/or based on the digital map; deriving from the ascertained scenario a degree of robustness for the localization system, e.g., a required degree of robustness; adapting a current degree of robustness of the localization system based on the degree of robustness derived from the scenario; allocating, using an allocation module of the localization system, at least a portion of the sensor data to at least a portion of the digital map based on the adapted degree of robustness; and ascertaining a position and/or an orientation of the vehicle using a position-determination module of the localization system and based on the sensor data allocated to the digital map.

The vehicle can particularly be an at least partially automated vehicle. The present method can simultaneously denote a method for operating a localization system and/or a method for controlling an at least partially automated vehicle.

The sensor data could be any data from one or a plurality of sensor(s) for the detection of the environment of the vehicle. For example, the sensor data can be camera data from one or a plurality of camera(s), radar data from one or a plurality of radar sensor(s), ultrasound data from one or a plurality of ultrasonic sensor(s), LIDAR data from one or a plurality of LIDAR sensor(s), and/or any other data. The sensor data can also denote data that were combined and/or merged with the other data. The method can thus include a step of combining data from different sensors in order to generate the sensor data.

The localization system can describe a vehicle-internal localization system. For example, the localization system can be implemented in a control unit of the vehicle. Alternatively or additionally, the localization system is able to be at least partially implemented in a vehicle-external data processing device such as a server and/or cloud server. The vehicle and the data processing device can have interfaces for a communication and/or for a data exchange.

In general, the ascertained scenario can denote a representation, an image, and/or estimation of at least a portion of the environment of the vehicle and/or at least one characteristic of the environment.

An ability of the localization system, i.e., ascertaining a correct location of the vehicle, i.e., a correct position and/or orientation of the vehicle, under adverse environment conditions and/or in an adverse environment, can be denoted as the robustness (or the required robustness) of the localization and/or the localization system. In general, the degree of robustness (and/or the robustness) can represent a measure of the correctness and/or a probability of the correctness of the localization of the vehicle. The localization system can be set up to achieve the current and/or the currently specified degree of robustness during the localization process. Thus, the degree of robustness can denote a localization demand for the localization system. This localization demand can represent and/or describe a quality, a performance, and/or a measure of the correctness of the localization. The accuracy of an estimation of the localization by the localization system relative to the digital map is able to define the correctness.

An ascertainment of the scenarios and an adaptation of the instantaneous degree of robustness based on the degree of robustness derived from the scenario advantageously allows for an adaptation of the localization system as a function of the scenario. This can in turn result in a considerable reduction of the computational power required for the localization. On the one hand, the localization can then be developed to be faster and more efficient, and on the other hand, more computational power is able to be made available to additional systems of the vehicle. Moreover, the energy consumption can be reduced in an advantageous manner. Due to the reduced computational power, demands on the hardware such as a control unit can be lower as well, so that more cost-effective hardware (such as the localization system) is able to be used for the localization.

A localization of the vehicle with a high degree of robustness can require considerable computational intensity. It can therefore be appropriate to find a compromise between computational intensity or computational power, precision in the localization and the degree of robustness. In conventional localization systems, only camera data, optionally in combination with a traffic-lane detection, LIDAR data, and perhaps additional data were merged with one another until now. Outliers in the sensor data are optionally detectable in conventional systems and disregarded.

In contrast to the conventional systems, it is provided according to the present invention to adapt the robustness and/or the degree of robustness of the localization system as a function of the scenario and the related localization demands on the localization. For example, the localization demands can be higher in the vicinity of an intersection featuring potentially high speeds of additional vehicles. In such a scenario, the degree of robustness (and/or at least one localization demand) can be correspondingly greater and/or adapted using the method according to the present invention. An operation of the vehicle in a parking space, on the other hand, can pose lower localization demands. In such a scenario, too, the degree of robustness (and/or at least one localization demand) is/are advantageously able to be appropriately adapted and/or reduced using the method according to the present invention.

According to an example embodiment of the present invention, the step of adapting the current degree of robustness includes a step of adapting at least one parameter of the allocation module of the localization system based on the degree of robustness derived from the scenario. For example, the allocation module can be re-parameterized.

According to an example embodiment of the present invention, the at least one parameter of the allocation module describes a number of objects taken into account in the environment of the vehicle, and/or a maximum distance to the vehicle up to which the sensor data are evaluated. In other words, a number of objects located in the environment and/or a horizon of the environment is/are able to be adapted based on the derived degree of robustness. For example, certain objects such as trees, houses and/or other static or semi-static objects in the environment can be masked in order to adapt the current degree of robustness based on the derived degree of robustness. Alternatively or additionally, objects at a distance greater than the maximum distance can be masked and/or disregarded.

According to an example embodiment of the present invention, the adapting of the at least one parameter of the allocation module includes at least one of the following sub-steps: selecting map data of the digital map for the allocation of the at least one portion of the sensor data; selecting a resolution of the digital map; selecting an algorithm, in particular a map-matching algorithm, for the allocation of the sensor data to the digital map; adapting at least one parameter of an algorithm, in particular a map-matching algorithm, for the allocation of the sensor data to the digital map; and adapting a particle number in a particle filter of the allocation module.

To adapt the instantaneous degree of robustness, for example, it can be sufficient to utilize only a portion of the information from a digital map that pertains to the environment. Also, a certain map type can be ascertained and/or used for adapting the current degree of robustness. In addition, depending on the derived degree of robustness, a robust algorithm or an non-robust algorithm can be selected. For example, a robust algorithm can be based on a spectral registration and/or an adaptation of a cost function. A non-robust algorithm can be based on a point-to-point allocation within the framework of an iterative process, for instance, and/or on a distance metric. Alternatively or additionally, one or more parameter(s) of the algorithm is/are able to be adapted and/or modified in order to adapt the current degree of robustness. For example, a maximum distance of points that form a corresponding pair is able to be modified in an iterative algorithm for determining the closest points (interactive closest point/ICT, algorithm). Alternatively or additionally, the sensor data can be filtered using a particle filter, and the particle number is able to be adapted in order to adapt the current robustness.

According to an example embodiment of the present invention, the step of adapting the current degree of robustness includes an adaptation of the data processing of the sensor data. For instance, a resolution of the sensor data, in particular a temporal resolution, can be modified. The sensor data can also be smoothed, aggregated, and/or pre-processed according to the degree of robustness. Also, a portion of the sensor data can be disregarded when adapting the degree of robustness with only another portion of the sensor data being allocated to the digital map.

According to an example embodiment of the present invention, the ascertained scenario includes an overlap and/or an overlap degree of a portion of the environment of the vehicle with objects in the environment. Alternatively or additionally, the scenario includes a number of objects in the environment of the vehicle. The scenario can also include a road type such as an interstate, a highway, a road featuring heavy traffic, a road featuring little traffic, a single-lane road, and/or a multi-lane road. Furthermore, the scenario can include an intersection, an intersection type, a parking space, and/or a town. The scenario can also include a road utilization degree of a road, a number of additional road users in the environment of the vehicle, a speed of the vehicle, a speed of additional road users, and/or a number of obstacles in the environment of the vehicle.

According to an example embodiment of the present invention, the step of ascertaining the scenario includes an ascertainment of a disturbance degree and/or a consistency degree of the sensor data. Alternatively or additionally, the step of ascertaining the scenario includes an ascertainment of a validity date of at least a portion of the digital map. In other words, a consistency and/or a deviation of the sensor data from one another can be taken into account for ascertaining the scenario. It can also be checked whether the digital map is up-to-date or outdated.

According to an example embodiment of the present invention, the method furthermore has a step of setting up an environment model of the vehicle based on at least a portion of the sensor data and/or based on at least a portion of the digital map, the degree of robustness being derived on the basis of the prepared environment model. The environment model can be generated on the basis of the sensor data, for instance, optionally in conjunction with environment information from the digital map. The environment model of the vehicle can particularly enable and/or represent an estimate of a real environment in which the vehicle is located, so that the scenario can be estimated and/or ascertained with high precision on the basis of the environment model.

According to an example embodiment of the present invention, the digital map has georeferenced data regarding a recommended degree of robustness, the derived degree of robustness being derived from the georeferenced data. In other words, the digital map can include degrees of robustness that are recommended as a function of geographical coordinates, on the basis of which the degree of robustness is able to be ascertained and/or derived for an adaptation of the current degree of robustness.

According to an example embodiment of the present invention, the method furthermore includes a step of ascertaining a scenario change and a step of deriving a further degree of robustness based on the ascertained scenario change. This advantageously makes it possible to adapt the degree of robustness in a dynamic manner in the event of a change in the scenario and/or the environment of the vehicle.

According to an example embodiment of the present invention, the method furthermore includes a step of generating a control command for the control of the vehicle based on the ascertained position and/or orientation. The control command can then be transmitted to a control unit of the vehicle, which can instruct the vehicle to execute the control command. The control command can include a speed specification, a speed, an acceleration, a speed reduction, and/or a steering movement, for example.

Another aspect of the present invention relates to a localization system for the robust localization of a vehicle, the localization system being developed to carry out the present method as described in the previous and the following text. The localization system can have a data memory and a processor. A program element which when executed on the processor, instructs the localization system to execute the method as described in the previous and the following text is able to be stored in the data memory. In addition, at least one digital map and/or sensor data can be stored in the data memory. Moreover, the localization system can have an allocation module for allocation of sensor data to a digital map and/or a position-determination module for ascertaining a location of the vehicle, i.e., a position and/or an orientation. The localization system can be installed and/or implemented in the vehicle. Alternatively or additionally, the localization system is able to be at least partially implemented on a server.

Features, elements, and/or steps of the present method, as described in the previous and the following text, can be features and/or elements of the localization system, and vice versa.

In the following text, example embodiments of the present invention are described in detail with reference to the appended figures, which are merely schematic and not true to scale, and in which identical, identically acting, or similar elements have been provided with the same reference numerals.

BRIEF DESCRIPTION OF THE DRAWING

FIG. 3 is a flowchart that illustrates steps of a method for the robust localization of a vehicle according to an example embodiment of the present invention.

DETAILED DESCRIPTION

Figure 1:
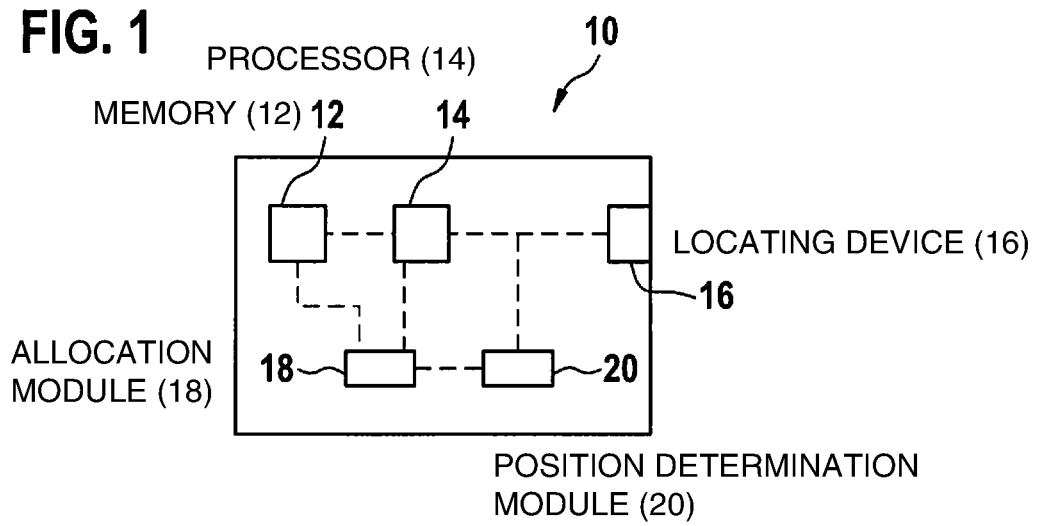
FIG. 1 shows a localization system according to an example embodiment of the present invention.

FIG. 1 shows a localization system 10 according to an example embodiment of the present invention. Localization system 10 has a data memory 12 and a processor 14. At least one digital map and sensor data from at least one sensor of a vehicle are stored in data memory 12. At least one digital map is also stored in data memory 12.

Optionally, localization system 10 has a locating device 16 for determining a position of the vehicle. Locating device 16 can have a GPS sensor, for example.

In addition, localization system 10 has an allocation module 18 for allocation of sensor data to the digital map. Moreover, localization system 10 has a position-determination module 20 for ascertaining a location of the vehicle, i.e., a position and/or an orientation.

Localization system 10 can be installed and/or implemented in the vehicle. Alternatively or additionally, localization system 10 is able to be at least partially implemented on a server, and data such as a control command for the control of the vehicle and/or data that describe a location of the vehicle can be exchanged via suitable interfaces of the vehicle and localization system 10.

Figure 2:
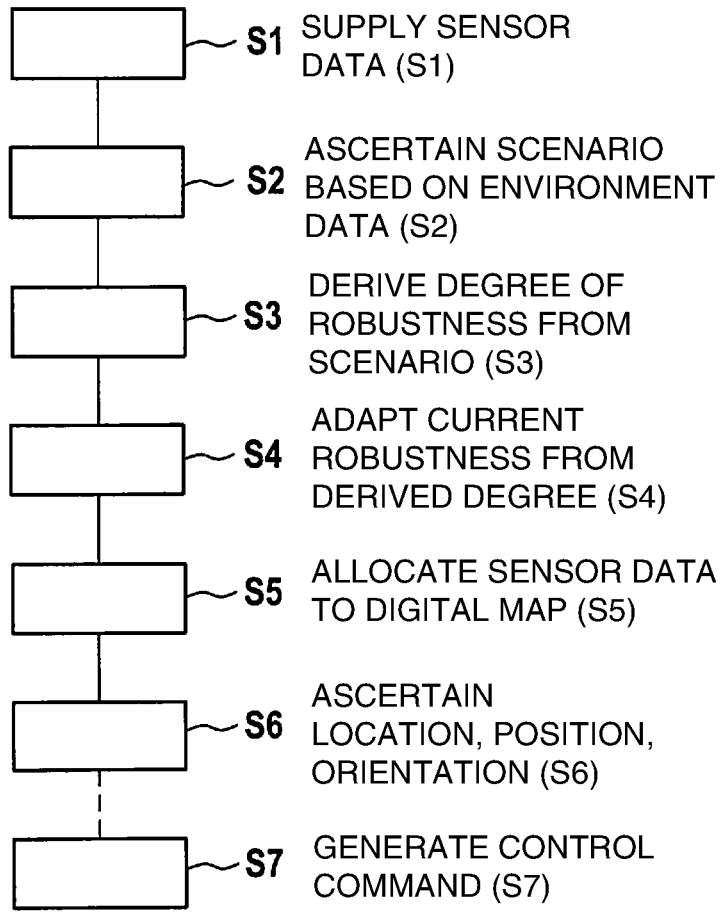
FIG. 2 is a flowchart that illustrates steps of a method for the robust localization of a vehicle according to an example embodiment of the present invention.

FIG. 2 illustrates steps of a method for the robust localization of a vehicle using a localization device 10 according to an example embodiment of the present invention. Localization device 10 can correspond to localization device 10 described with reference to FIG. 1.

In a step S1, sensor data is supplied from at least one sensor of the vehicle, the sensor data including information that pertains to an environment of the vehicle. In addition, step S1 includes the supply of a digital map of the environment of the vehicle.

In a step S2, a scenario based on the environment of the vehicle is ascertained based on the sensor data and/or based on the digital map. The scenario based on the environment of the vehicle can encompass information pertaining to an overlap of a portion of the environment of the vehicle with objects in the environment, a number of objects in the environment of the vehicle, a road type, an intersection, an intersection type, a parking space, a town, a road usage degree, a number of further road users in the environment of the vehicle and/or a number of obstacles in the environment of the vehicle. The scenario can also include information with regard to the speed of the vehicle and/or a speed of additional road users.

To ascertain the scenario in step S2, a disturbance degree and/or a consistency degree of the sensor data can optionally be ascertained as well. Alternatively or additionally, a validity date of at least a portion of the digital map is able to be ascertained.

In step S2, it is also possible to set up an environment model of the vehicle based on at least a portion of the sensor data and/or based on at least a portion of the digital map. For example, the scenario can be derived from the environment model. The scenario can also be determined on the basis of the digital map.

In a further step S3, a degree of robustness for localization system 10 is derived from the scenario ascertained in step S2 and/or ascertained on the basis of the scenario.

In a further step S4, a current degree of robustness of localization system 10 is adapted based on the degree of robustness derived from the scenario.

Toward this end, at least one parameter of allocation module 18 of localization system 10 is able to be adapted based on the degree of robustness derived from the scenario. For example, the parameter can describe a number of objects taken into account in the environment of the vehicle. The parameter can also describe a maximum distance to the vehicle up to which the sensor data are evaluated and/or within which the sensor data are taken into account.

Moreover, in step S4, map data of the digital map and/or an algorithm for allocation of the sensor data to the digital map is/are able to be selected and/or adapted in order to adapt the current degree of robustness. It is also possible to select and/or adapt a resolution of the digital map. At least one parameter of an algorithm for allocation of the sensor data to the digital map is selectable and/or adaptable in addition. A particle number in a particle filter of allocation module 18 is also able to be adapted. Alternatively or additionally, the data processing of the sensor data can be adapted.

In a further step S5, at least a portion of the sensor data is allocated to at least a portion of the digital map using allocation module 18 of localization system 10 and based on the degree of robustness adapted in step S4.

In a further step S6, position-determination module 20 of localization system 10 is employed to ascertain a location, a position, and/or an orientation of the vehicle based on the sensor data allocated to the digital map.

In an optional step S7, a control command is generated for the control of the vehicle based on the location, position, and/or orientation ascertained in step S6. The control command is able to be output via an interface of the localization system and made available to a further control unit of the vehicle, for example. The control unit can then navigate, position, control, and/or guide the vehicle based on the control command.

FIG. 3 shows steps of a method for the robust localization of a vehicle according to an example embodiment of the present invention. Unless otherwise stated, the method of FIG. 3 has the same steps as the method of FIG. 2. In a step S1, a starting location, i.e., a starting position and/or a starting orientation of the vehicle, is/are ascertained using locating device 16, for instance.

In a step S2, localization system 10 is initialized and able to be operated, e.g., in a standard mode with a predefined degree of robustness, a predefined performance of localization system 10, and/or a predefined locating precision.

In step S3, a location, i.e., a position and/or an orientation, of the vehicle can be ascertained and optionally output in step S3'.

In step S4, a scenario can then be ascertained based on the digital map and/or based on sensor data from the sensor of the vehicle, as described in connection with FIG. 2.

In step S4', a degree of robustness for the localization system is able to be derived from the scenario, as described in connection with FIG. 2.

In addition, in steps S4 and/or S4', a current degree of robustness and/or the predefined degree of robustness can be adapted based on an adaptation of at least one parameter of localization system 10, as described in connection with FIG. 2.

The parameter adapted in such a manner and/or the adapted degree of robustness is/are then able to be used for locating the vehicle according to step S3 and/or for outputting the location in step S3'.

Steps S3 and S4 and optionally also S3' and S4' can be run through iteratively. As soon as a change in the scenario is ascertained in step S4, at least one of steps S4', S3 and S3' can be triggered and/or initiated.

"Including" does not exclude other elements, and "a" or "an" does not exclude a plurality. Additionally, features that have been described with reference to one of the above example embodiments can also be used in combination with other features of other example embodiments described above.

What is claimed is:

1. A method for providing a robust localization of a vehicle using a localization system, the method comprising:
   supplying, via a processor of the localization system, sensor data of at least one sensor of the vehicle, the sensor data including information pertaining to at least one of an environment and a movement of the vehicle, wherein the localization system includes:
   a processor;
   a memory;
   an allocation module;
   a locating device; and
   a position determination module, which is coupled to the allocation module, the processor, and the locating device;
   wherein the processor is coupled to the memory, the locating device, the position determination module, and the allocation module,
   wherein the memory is coupled to the allocation module, which is coupled to the memory, the processor, and the position determination module;
   providing, via the processor, the digital map of the environment of the vehicle;
   ascertaining, via the processor, a scenario of the environment of the vehicle based on at least one of the sensor data and the digital map to provide an ascertained scenario;
   deriving, via the processor, a robustness degree for the localization system based on the ascertained scenario to provide a derived robustness degree;
   adapting, via the processor, at least one parameter, including a current robustness degree of the localization system, based on the derived robustness degree to provide an adapted robustness degree, wherein the adapting includes adapting at least one parameter based on the derived robustness degree, and wherein the at least one parameter also describes a maximum distance to the vehicle for which the sensor data are evaluated or within which the sensor data are taken into account;
   allocating, via the processor, at least a portion of the sensor data to at least a portion of the digital map using the localization system and based on the adapted robustness degree;
   ascertaining, via the processor, based on the sensor data allocated to the digital map, a position or an orientation of the vehicle using the localization system; and
   generating a control command for controlling the vehicle based on the ascertained position or ascertained orientation, wherein the control command is outputtable via an interface of the localization system and made available to a further control unit of the vehicle, and wherein the control unit navigates or controls the vehicle based on the control command.

2. The method of claim 1, wherein the at least one parameter characterizes a number of objects taken into account in the environment of the vehicle.

3. The method of claim 1, wherein the adapting of the at least one parameter includes at least one:
   selecting map data of the digital map for the allocating;
   selecting a resolution of the digital map;
   selecting an algorithm for the allocating;
   adapting at least one parameter of an algorithm for the allocating; and/or adapting a particle number in a particle filter of the allocation.

4. The method of claim 1, wherein the adapting of the at least one parameter includes adapting at least one parameter of a map-matching algorithm for the allocation.

5. The method of claim 1, wherein the adapting of the current robustness degree includes adapting a processing of the sensor data.

6. The method of claim 1, wherein the ascertained scenario of the environment includes at least one of:
   an overlap of a portion of the environment of the vehicle with objects in the environment;
   a number of objects in the environment of the vehicle;
   a road type;
   an intersection;
   an intersection type;
   a parking space;
   a town;
   a road usage degree;
   a number of road users in the environment of the vehicle;
   a speed of the vehicle;
   a speed of thee road users; and/or
   a number of obstacles in the environment of the vehicle.

7. The method of claim 1, wherein the ascertaining the scenario includes at least one of:
   ascertaining a disturbance degree of the sensor data;
   ascertaining a consistency degree of the sensor data; and/or
   ascertaining a validity date of at least a portion of the digital map.

8. The method of claim 1, further comprising:
   setting up an environment model of the vehicle based on at least one of: (a) at least a portion of the sensor data; and (b) at least a portion of the digital map, wherein the robustness degree is derived based on the environment model.

9. The method of claim 1, wherein the digital map includes georeferenced data, and wherein the derived robustness degree is derived based on the georeferenced data.

10. The method of claim 1, further comprising:
    ascertaining a scenario change and deriving a further robustness degree based on the ascertained scenario change.

11. A localization system, comprising:
    a processor;
    a memory;
    an allocation module;
    a locating device; and
    a position determination module, which is coupled to the allocation module, the processor, and the locating device;
    wherein the processor is coupled to the memory, the locating device, the position determination module, and the allocation module,
    wherein the memory is coupled to the allocation module, which is coupled to the memory, the processor, and the position determination module; and
    a non-transitory computer readable medium having a computer program, which is executable by the processor, wherein the computer program is for providing a robust localization of a vehicle, by performing the following:
        obtaining, via the processor, from the memory, the sensor data of at least one sensor of the vehicle, the sensor data including information pertaining to at least one of an environment and a movement of the vehicle;
        obtaining, via the processor, from the memory, the digital map of the environment of the vehicle;
        ascertaining, via the processor, a scenario of the environment of the vehicle based on at least one of the sensor data and the digital map to provide an ascertained scenario;
        deriving, via the processor, a robustness degree for the localization system from the ascertained scenario to provide a derived robustness degree;
        adapting, via the processor, at least one parameter, including a current robustness degree of the localization system, based on the derived robustness degree to provide an adapted robustness degree, wherein the adapting includes adapting at least one parameter based on the derived robustness degree, and wherein the at least one parameter also describes a maximum distance to the vehicle for which the sensor data are evaluated or within which the sensor data are taken into account;
        allocating, via the processor, at least a portion of the sensor data to at least a portion of the digital map using the localization system and based on the adapted robustness degree;
        ascertaining, via the processor, based on the sensor data allocated to the digital map, a position or an orientation of the vehicle using the localization system; and
        generating a control command for controlling the vehicle based on the ascertained position or ascertained orientation, wherein the control command is outputtable via an interface of the localization system and made available to a further control unit of the vehicle, and wherein the control unit navigates or controls the vehicle based on the control command.

* * * * *